United States Patent [19]

Weber

[11] Patent Number: 5,596,708
[45] Date of Patent: Jan. 21, 1997

[54] METHOD AND APPARATUS FOR THE PROTECTION OF WRITE DATA IN A DISK ARRAY

[75] Inventor: Bret S. Weber, Wichita, Kans.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 591,366

[22] Filed: Jan. 25, 1996

Related U.S. Application Data

[63] Continuation of Ser. No. 223,264, Apr. 4, 1994.

[51] Int. Cl.$^6$ .................................................. G06F 13/00
[52] U.S. Cl. ......................... 395/182.04; 395/183.18
[58] Field of Search ......................... 395/182.04, 182.05, 395/183.18

[56] References Cited

U.S. PATENT DOCUMENTS

| | | | |
|---|---|---|---|
| 3,801,963 | 4/1974 | Chen et al. | 395/425 |
| 4,603,406 | 7/1986 | Miyazaki et al. | 365/229 |
| 4,654,829 | 3/1987 | Jiang et al. | 365/229 |
| 4,669,066 | 5/1987 | Kagawa et al. | 365/229 |
| 4,868,832 | 9/1989 | Marrington et al. | 371/66 |
| 4,985,870 | 1/1991 | Faraci | 365/228 |
| 5,016,223 | 5/1991 | Kimura et al. | 365/229 |
| 5,226,006 | 7/1993 | Wang et al. | 365/189.01 |
| 5,243,575 | 9/1993 | Sambandan et al. | 365/233.5 |
| 5,263,003 | 11/1993 | Cowles et al. | 365/230.03 |
| 5,267,218 | 11/1993 | Elbert | 365/226 |
| 5,379,417 | 1/1995 | Lui et al. | 395/575 |
| 5,418,921 | 5/1995 | Cortney et al. | 395/425 |

*Primary Examiner*—Vincent P. Canney
*Attorney, Agent, or Firm*—Wayne P. Bailey; James M. Stover

[57] ABSTRACT

A transfer memory backup system for a RAID level 5 disk array storage system which includes a transfer buffer, wherein write data received by the array is written into a transfer buffer, and a write complete status signal generated, prior to the write data being written to the disk drives within the array. The transfer memory backup system includes a low power, industry standard PCMCIA (Personal Computer Memory Card International Association) device along with a small, temporary voltage source made up of a small rechargeable battery or a high capacitance gold capacitor. Upon the detection of a disk array storage system failure, low power logic provides continuous refresh for the transfer buffer as well as power to the components included in the transfer memory backup system upon a disk array storage system failure. A low power CMOS microprocessor with self contained microcode (mask programmable ROM) controls the transfer of data from the transfer buffer to removable storage medium within the PCMCIA device.

31 Claims, 13 Drawing Sheets

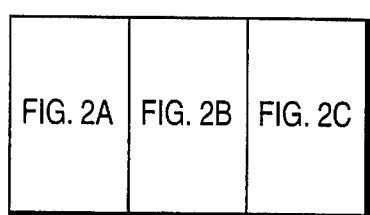
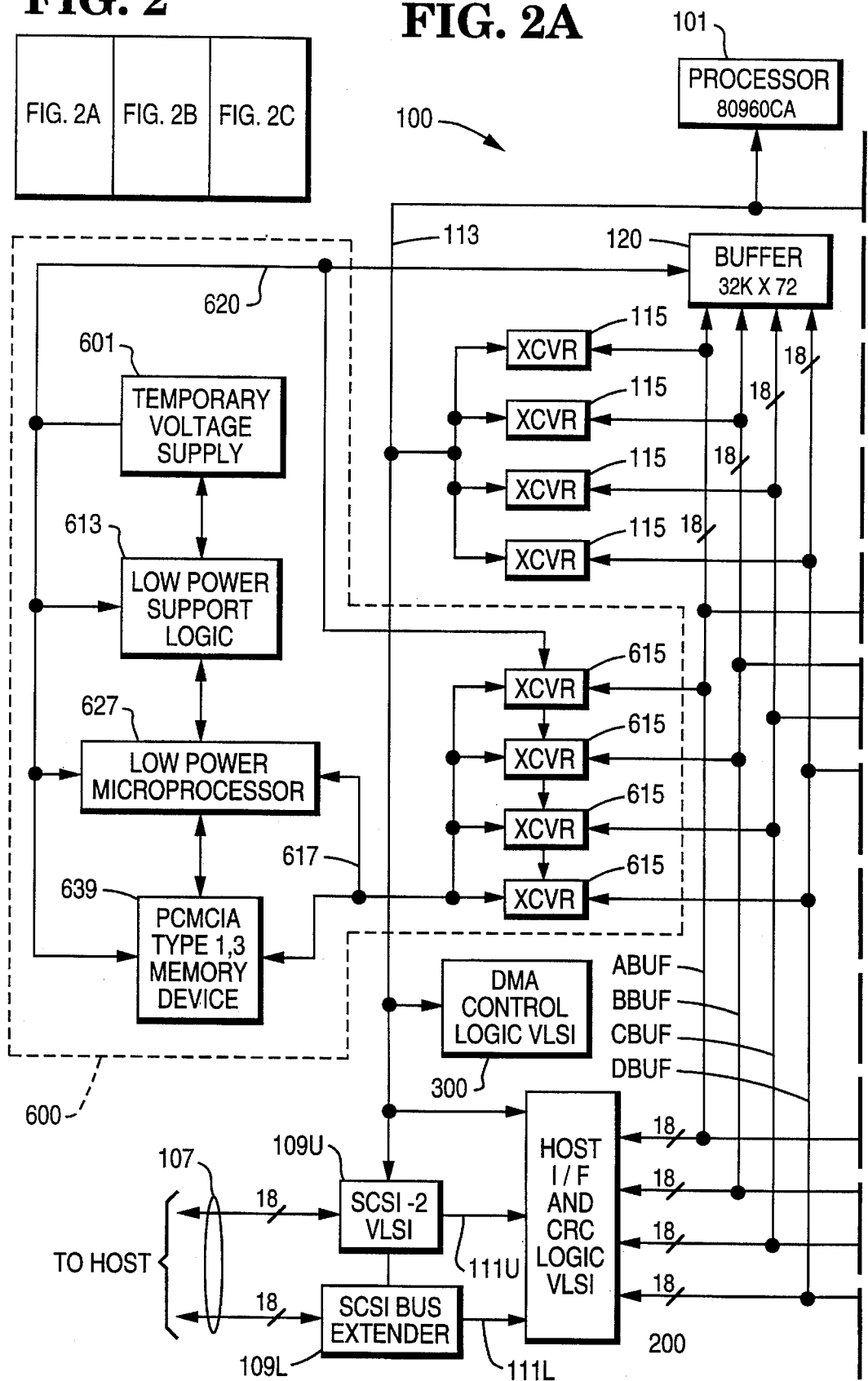
FIG. 2
FIG. 2A

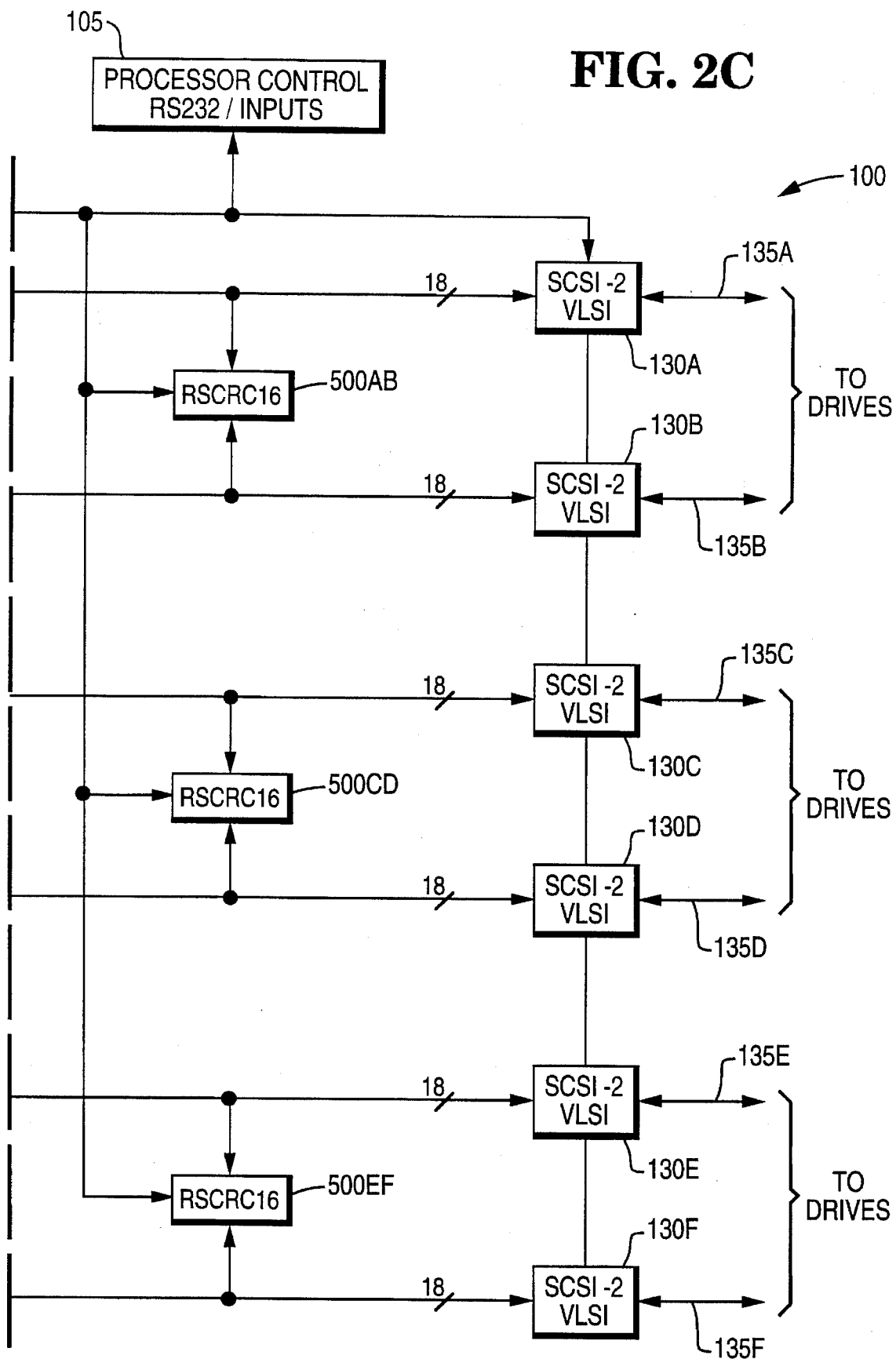

METHOD AND APPARATUS FOR THE PROTECTION OF WRITE DATA IN A DISK ARRAY

This is a continuation of application Ser. No. 08/223,264 filed Apr. 4, 1994.

The present invention relates to disk array storage devices for computer systems and, more particularly, to a method for safeguarding disk array write operations.

BACKGROUND OF THE INVENTION

Disk arrays comprising a multiplicity of small inexpensive disk drives, such as the 5¼ or 3½ inch disk drives currently used in personal computers and workstations, connected in parallel have emerged as a low cost alternative to the use of single large disks for non-volatile storage of information within a computer system. The disk array appears as a single large fast disk to the host system but offers improvements in performance, reliability, power consumption and scalability over a single large magnetic disk. Several disk array alternatives are discussed in an article titled "A Case for Redundant Arrays of Inexpensive Disks (RAID)" by David A. Patterson, Garth Gibson and Randy H. Katz; University of California Report No. UCB/CSD 87/391, December 1987. The article, incorporated herein by reference, discusses disk arrays and the improvements in performance, reliability, power consumption and scalability that disk arrays provide in comparison to single large magnetic disks. Five disk array arrangements, referred to as RAID levels, are described. The simplest array, a RAID level 1 system, comprises one or more disks for storing data and an equal number of additional "mirror" disks for storing copies of the information written to the data disks. The remaining RAID levels, identified as RAID level 2, 3, 4 and 5 systems, segment the data into portions for storage across several data disks. One or more additional disks are utilized to store error check or parity information. The present invention is directed to improvements in the operation of RAID level 4 and 5 systems.

A RAID level 4 disk array is comprised of N+1 disks wherein N disks are used to store data, and the additional disk is utilized to store parity information. Data to be saved is divided into portions consisting of one or many blocks of data for storage among the disks. The corresponding parity information, which can be calculated by performing a bitwise exclusive-OR of corresponding portions of the data stored across the N data drives, is written to the dedicated parity disk. The parity disk is used to reconstruct information in the event of a disk failure. Writes typically require access to two disks, i.e., one of the N data disks and the parity disk, as will be discussed in greater detail below. Read operations typically need only access a single one of the N data disks, unless the data to be read exceeds the block length stored on each disk.

RAID level 5 disk arrays are similar to RAID level 4 systems except that parity information, in addition to the data, is distributed across the N+1 disks in each group. Each one of the N+1 disks within the array includes some blocks for storing data and some blocks for storing parity information. Where parity information is stored is controlled by an algorithm implemented by the user. As in RAID level 4 systems. RAID level 5 writes typically require access to two disks; however, no longer does every write to the array require access to the same dedicated parity disk, as in RAID level 4 systems. This feature provides the opportunity to perform concurrent write operations.

A RAID level 5 system including five data and parity disk drives, DRIVE A through DRIVE E, and a spare disk drive, DRIVE F, is illustrated in FIG. 1. An array controller 100 coordinates the transfer of data between the host system 147 and the array disk drives. The controller also calculates and checks parity information. Blocks 145A through 145E illustrate the manner in which data and parity is stored on the five array drives. Data blocks are identified as BLOCK 0 through BLOCK 15. Parity blocks are identified as PARITY 0 through PARITY 3. The relationship between the parity and data blocks is as follows:

PARITY 0=(BLOCK 0) XOR (BLOCK 1) XOR (BLOCK 2) XOR (BLOCK 3)
PARITY 1=(BLOCK 4) XOR (BLOCK 5) XOR (BLOCK 6) XOR (BLOCK 7)
PARITY 2=(BLOCK 8) XOR (BLOCK 9) XOR (BLOCK 10) XOR (BLOCK 11)
PARITY 3=(BLOCK 12) XOR (BLOCK 13) XOR (BLOCK 14) XOR (BLOCK 15)

As stated above, parity data can be calculated by performing a bit-wise exclusive-OR of corresponding portions of the data stored across the N data drives. However, because each parity bit is simply the exclusive-OR product of all the corresponding data bits from the data drives, new parity can be more easily determined from the old data and the old parity as well as the new data in accordance with the following equation:

$$\text{new parity} = (\text{old data XOR new data}) \text{ XOR old parity}.$$

Although the parity calculation for RAID levels 4 or 5 shown in the above equation is much simpler than performing a bit-wise exclusive-OR of corresponding portions of the data stored across all of the data drives, a typical RAID level 4 or 5 write operation will require a minimum of two disk reads and two disk writes. More than two disk reads and writes are required for data write operations involving more than one data block. Each individual disk read operation involves a seek and rotation to the appropriate disk track and sector to be read. The seek time for all disks is therefore the maximum of the seek times of each disk. A RAID level 4 or 5 system thus carries a significant write penalty when compared with a single disk storage device or with RAID level 1, 2 or 3 systems.

One method for decreasing the RAID level 4 and 5 write penalty is to perform an early write operation wherein write data received from the host is written into a transfer buffer and a write complete status signal provided back to the host. The array controller completes the read-modify-write operation at a later, more convenient time. Drive utilization efficiency and I/O response time for read-modify-write operations may be also be improved by separating the execution of data read and write operations from the execution of parity read, generation and write operations. The improved read-modify-write operation identifies the disk drives containing the data and parity to be updated and places the proper read and write requests into the I/O queues for the identified data and parity drives, scheduling some or all parity operations; i.e. reading old parity information from the parity drive, generating new parity information and writing the new parity information to the parity drive; for execution when best accommodated in the I/O queue for the parity drive, following the read of old data from the data drive. A write completion status signal is provided to the host system just after the write of data to the data drive is completed, without waiting for the associated parity generation and write to of new parity information to the parity drive to complete.

The two strategies discussed above for reducing array write penalties are not without shortcomings. Possible problems which may arise with the implementation of these early write procedures include:

1. A power failure following issuance of the write complete status signal to the host, but before completion of write operations to transfer data and parity from the transfer buffer to disk could result in the loss of data.

2. Should the disk array subsystem experience a controller failure prior to the completion of write operation, there exists no method for transferring the data written into the transfer buffer to a replacement controller.

3. Although a battery backup can be provided to protect against a power failure, there are severe time constraints which limit the continued operation of the array during a protracted power loss.

4. A transfer buffer providing full speed data transfer capabilities supported by a battery backup can be provided to protect against data loss, however, a RAM buffer that is fast enough to be used for full speed data transfers is typically very expensive or power hungry. These constrains require the use of large batteries, multiple batteries, or batteries which are contained off the controller board.

A method and structure for safeguarding disk array early write operations is required to prevent the data loss resulting from the occurrence of a power failure or array failure prior to completion of all write procedures.

OBJECTS OF THE INVENTION

It is therefore an object of the present invention to provide a new and useful method and apparatus for safeguarding disk array write operations.

It is another object of the present invention to provide such a method and apparatus for recovering write data following the failure of a RAID level 4 or 5 early write operation.

It is yet another object of the present invention to provide a new and useful disk storage system utilizing volatile memory to provide an early write complete signal and including a low power non-volatile storage device and low power backup logic to store the contents of the volatile memory in the event of a data storage system failure.

It is still a further object of the present invention to provide a new and useful transfer memory backup system for a disk array storage system performing early write operations.

SUMMARY OF THE INVENTION

There is provided, in accordance with the present invention, a transfer memory backup system for a data storage system which includes a transfer buffer, wherein write data received from a host is written into the transfer buffer and a write complete status signal is provided by the data storage system to the host prior to the write data being written to a permanent storage device within the data storage system. The transfer memory backup system includes a low power, non-volatile storage device, such as a PCMCIA flash card device or PCMCIA disk drive, connected to transfer data with the data storage system transfer buffer; a small, temporary voltage source connected to provide power to the transfer buffer and the non-volatile storage device; and logic responsive to the receipt of a signal from said data storage system indicating the occurrence of a data storage system failure for controlling the operation of the temporary voltage source to provide power to the non-volatile storage device and the transfer buffer, and for controlling the non-volatile storage device and transfer buffer to transfer data residing in the transfer buffer to the non-volatile storage device.

In the detailed description which follows, a RAID level 5 disk array storage system is described. The preferred embodiment of the invention comprises an industry standard PCMCIA (Personal Computer Memory Card International Association) device along with a small, temporary voltage source made up of a small rechargeable battery or a high capacitance gold capacitor. Low power logic is provided to provide continuous refresh for the transfer buffer as well as power to the components included in the transfer memory backup system. A low power CMOS microprocessor with self contained microcode (mask programmable ROM) controls the transfer of data from the transfer buffer to removable storage medium within the PCMCIA device. PCMCIA device 639 is either a type 1 form factor device accepting a type 1 flash memory card as the removable storage medium, or a type 3 form factor device accepting a 1.3 inch form factor disk drive.

The above and other objects, features, and advantages of the present invention will become apparent from the following description and the attached drawings.

BRIEF DESCRIPTION OF THE DRAWINGS

FIGS. 2, 2A, 2B and 2C illustrate in block diagram form one possible architecture for disk array controller 100 shown in FIG. 1, including the .

DETAILED DESCRIPTION OF THE PREFERRED EMBODIMENT

Array Controller Architecture

Figure 1:
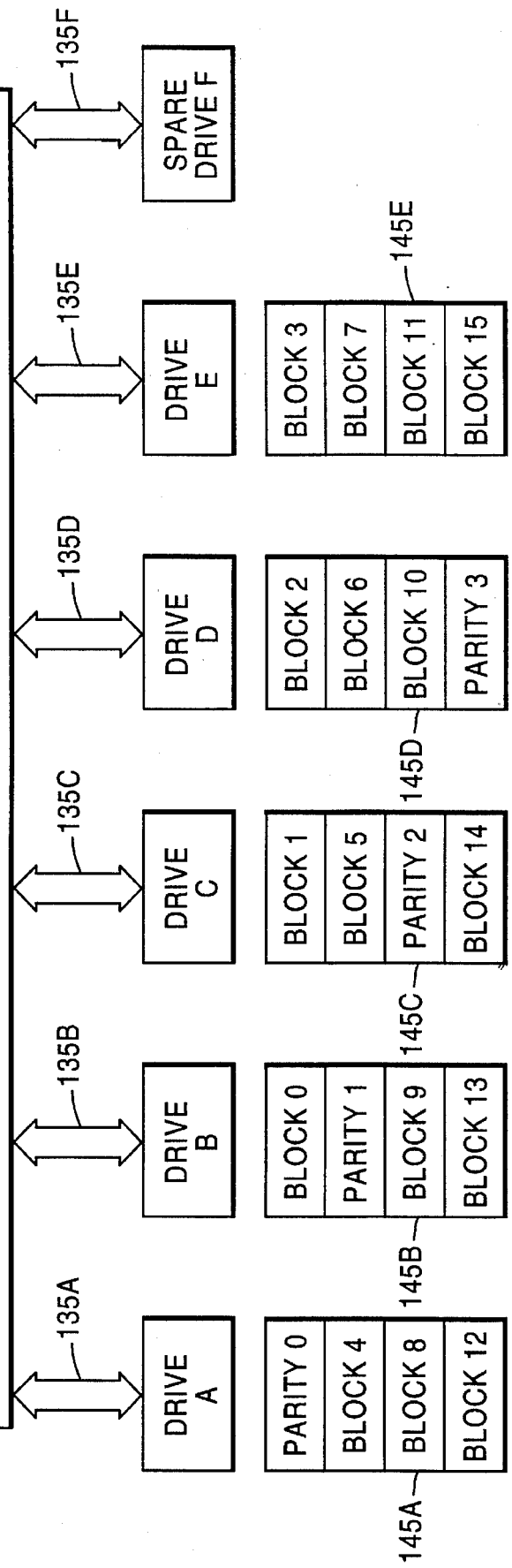
FIG. 1 is a block diagram representation of a RAID level 5 array including six disk drives.
Figure 2B:
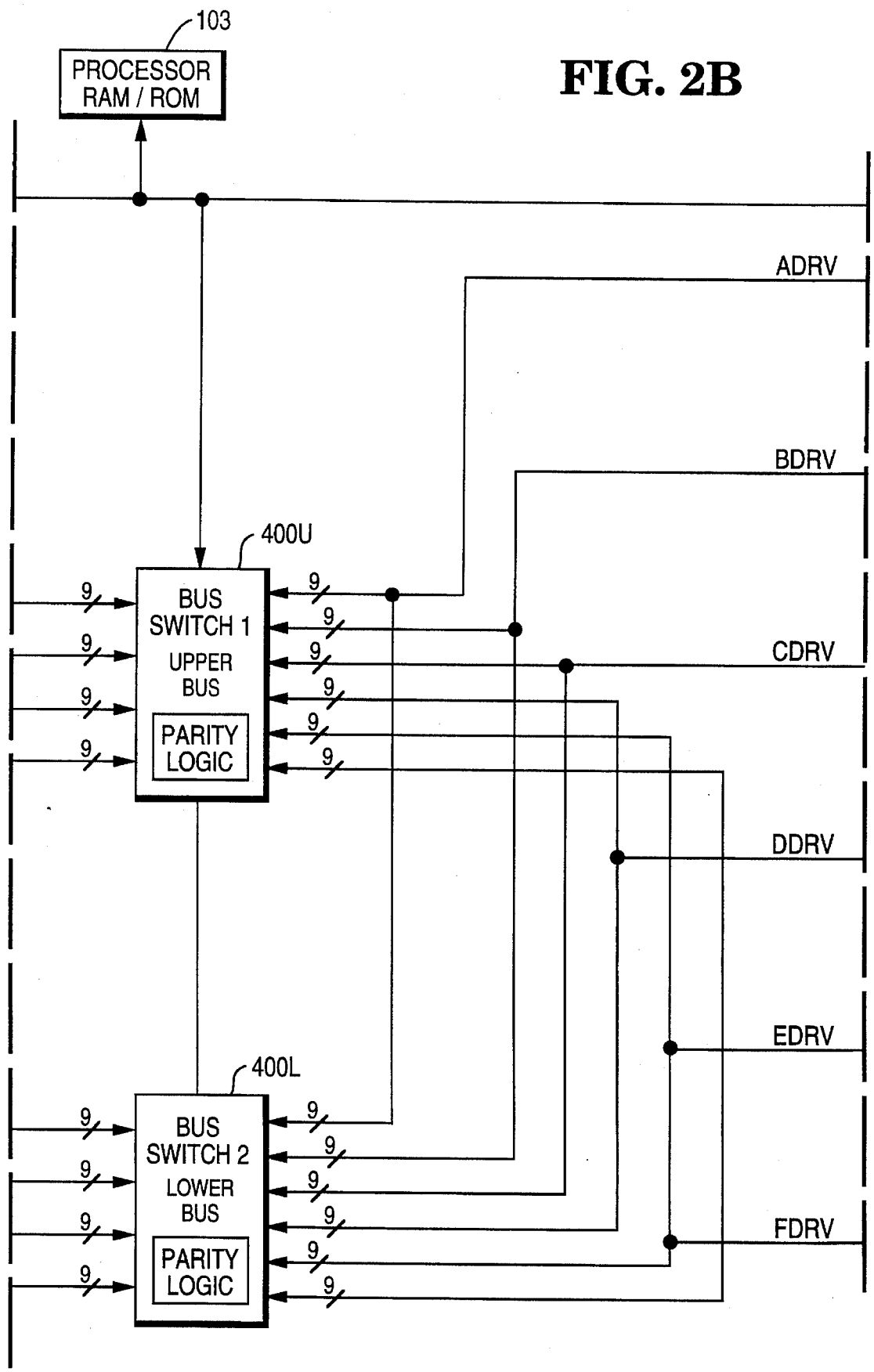

Referring now to FIGS. 2A and 2B, the architecture of a disk array controller 100 for a RAID system is shown in block diagram form. The array controller coordinates the operation of the multitude of disk drives within the array to perform read and write functions, parity generation and checking; and data restoration and reconstruction. The controller exchanges data with the host computer system (not shown) through Host Interface and CRC Logic block 200. Host I/F Logic block 200, under the control of processor 101, interfaces an external 18-bit or 36-bit wide, SCSI-2 bus 107 associated with the host system with four internal 18-bit wide buffer busses ABUF, BBUF, CBUF and DBUF. Bus 107 connects to Host I/F Logic block 200 through a standard SCSI-2 chip set, represented by blocks 109U and 109L and eighteen-bit busses 111U and 111L. Interconnection between block 200 and processor 101 is provided by address/data bus 113.

Host I/F Logic block 200 operates to multiplex data between SCSI-2 devices 109U and 109L and the four buffer busses ABUF, BBUF, CBUF and DBUF. Block 200 provides multiplexing functionality between busses 111U and 111L and (1) all four buffer busses for 4+1 RAID level 3 and high bandwidth RAID level 5 applications by word stripping data across the four buffer busses in a rotating sequential order, (2) one of two defined pairs of buffer busses for 2+1 RAID level 3 applications by word stripping data across the pair of buffer busses in a rotating sequential order, of (3) any one of the buffer busses for RAID level 1 and single bus RAID level 5 applications.

Internal buffer busses ABUF, BBUF, CBUF and DBUF connect Host I/F Logic block 200 with a RAM buffer 120 and upper and lower byte bus switches 400U and 400L. Buffer 120, which may be a DRAM or SRAM buffer, possesses the capability to read and write 72-bit wide words from the four buffer busses, or individual 18-bit wide words from any one of the buffer busses. Eighteen or 36-bit access is also provided through transceivers 115 to bus 113.

Figure 3:
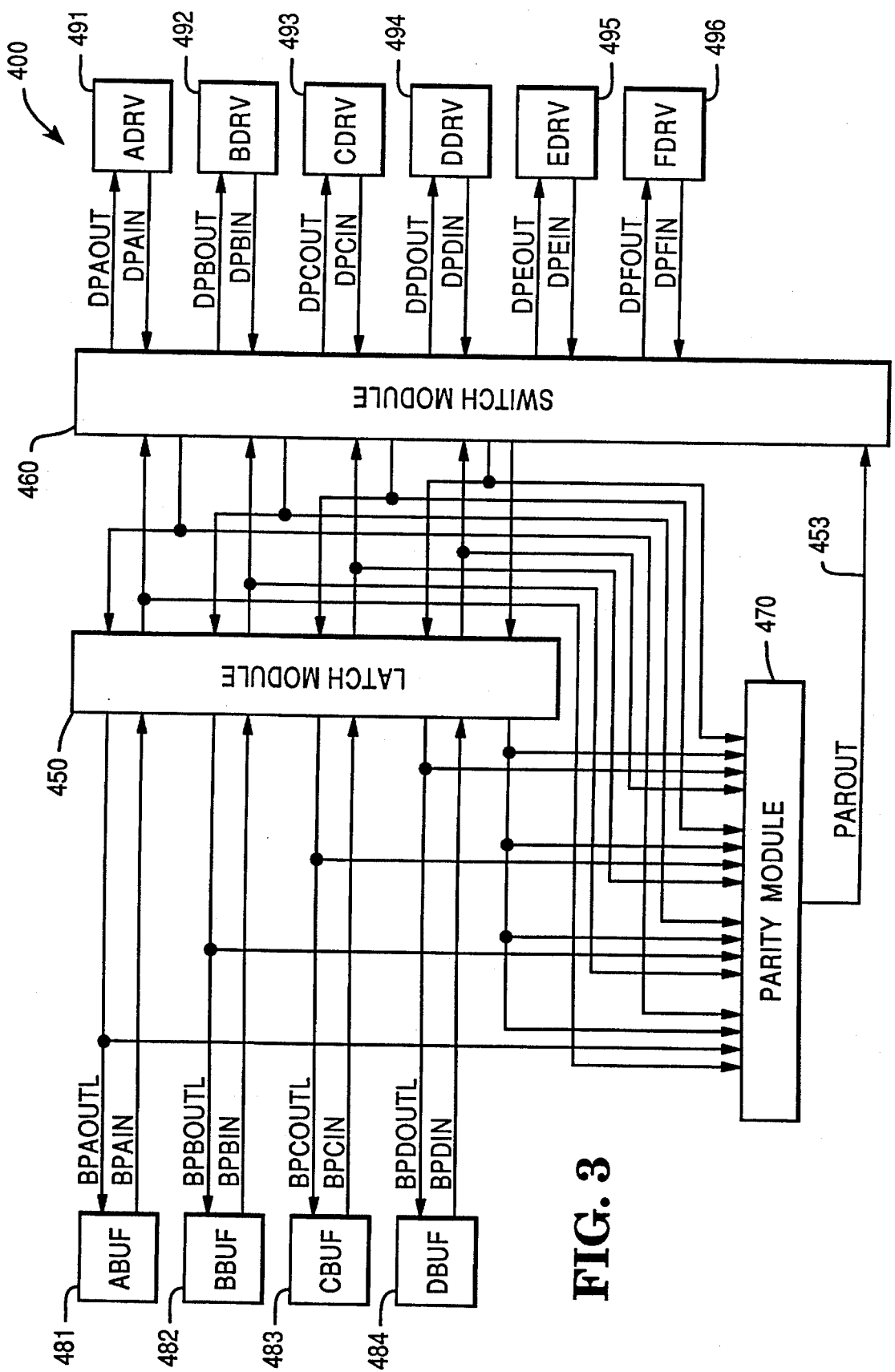
FIG. 3 is a block diagram illustration of the logic included within Bus Switch block 400U shown in FIGS. 2A and 2B.

Bus switches 400U and 400L provides variable bus mapping between buffer busses ABUF, BBUF, CBUF and DBUF and six 18-bit wide drive busses labeled ADRV, BDRV, CDRV, DDRV, EDRV and FDRV, each switch providing routing for one byte (eight bits data and one bit parity) of information. Bus switches 400U and 400L further include the capability to generate parity information, which may be directed onto any of the buffer or drive busses, check parity information and reconstruct information stored on a failed disk drive. FIG. 3, discussed below, provide greater detail concerning the construction and operation of bus switches 400U and 400L.

Each one of drive busses ADRV, BDRV, CDRV, DDRV, EDRV and FDRV is connected to an associated SCSI-2 device, labeled 130A through 130F, which provide connection to six corresponding disk drives (not shown) forming the disk array. The six drives will be identified herein as drives A through F. Reed-Solomon Cyclic Redundancy Check (RSCRC) logic blocks 500AB, 500CD and 500EF are connected between busses ADRV and BDRV, CDRV and DDRV, and EDRV and FDRV, respectively, to provide error detection and generation of Reed-Solomon CRC for the array controller.

The control of Host I/F Logic block 200; bus switches 400U and 400L; RSCRC logic blocks 500AB, 500CD and 500EF; and SCSI devices 109U, 109L, and 130A through 130F is provided by microprocessor 101. Communication between microprocessor 101, associated processor memory 103 and processor control inputs 105 and the above-identified elements is provided by address/data bus 113. Also shown connected to bus 113 is DMA Control Logic block 300. The logic within block 300 provides DMA control for Host I/F Logic block 200, bus switches 400U and 400L, SCSI-2 devices 130A through 130F and processor 101.

The controller architecture shown in FIGS. 2A and 2B can be configured to accommodate different quantities of disk drives and also to accommodate different RAID configurations. Additional detail concerning the structure and operation of the disk array controller discussed above is provided in U.S. Pat. No. 5,257,391, incorporated herein by reference. U.S. Pat. No. 5,257,391, entitled "Disk Controller having Host Interface and Bus Switches for Selecting Buffer and Drive Busses Respectively Based on Configuration Control Signals," is assigned to NCR Corporation.

Bus Switch Architecture

The logic included within each one of bus switches 400U and 400L is shown in the block diagram of FIG. 3. The structure shown is formed upon a single semiconductor chip. The four host ports, labeled 481 through 484, provide connection to the four controller busses ABUF, BBUF, CBUF and DBUF, respectively. The array ports, identified by reference numerals 491 through 496, connect with the six disk drive busses ADRV, BDRV, CDRV, DDRV, EDRV and FDRV, respectively. Bus switches 400U and 400L operate together to provide a unidirectional connection between any one of controller buses ABUF, BBUF, CBUF and DBUF and any one of drive buses ADRV, BDRV, CDRV, DDRV, EDRV and FDRV. Multiple connections between several controller busses and an equal number of drive busses is also permitted. Additionally, the bus switches may provide unidirectional connection of any controller bus to two or more drive busses. Parity information obtained via bus 453 can also be ported to any one of the drive busses.

The architecture of each bus switch is composed of three primary blocks: a latch module 450, switch module 460, and a parity module 470. Switch module 460 is connected between controller busses ABUF, BBUF, CBUF and DBUF and drive busses ADRV, BDRV, CDRV, DDRV, EDRV and FDRV. An additional bus 453 connects parity module 470 to bus switch module 460. Several functions are provided by bus switch module 460. First, bus switch module 460 provides a unidirectional connection between any controller bus and any drive bus. Multiple connections between several controller busses and an equal number of drive busses is also permitted.

Second, the bus switch module provides connection between any two or more of the drive busses. Such an operation is necessary for the transfer of information between disk drives without interfering with host or controller operations.

Third, bus switch module 460 provides connection between any two or more of the controller busses. This mode of operation supports data reorganization on the controller by allowing data to be propagated from one controller bus to another. This mode of turnaround operation is also advantageous for BIST (Built-In Self Test) development.

Finally, the bus switch module provides unidirectional connection of any controller bus to one or more drive busses. Parity information obtained via bus 453 can also be ported to any one of the drive busses.

Parity module 470 includes connections to each of the controller busses for receiving data therefrom and a connection to bus 453 for providing parity information to bus switch module 460. Parity module 470 generates parity information for RAID level 3, 4 and 5 operations by performing a bit-wise exclusive-OR of each active controller bus. The parity information is provided to bus switch module 460 via bus 453.

Additional detail concerning the structure and operation of bus switches 400U and 400L discussed above and shown in FIG. 3 is provided in U.S. patent application No. 07/701,921, filed on May 17, 1991, incorporated herein by reference. U.S. patent application No. 07/701,921, entitled "Multi-Channel Data And Parity Exchange Device," is assigned to NCR Corporation.

Non-Volatile Memory Backup Logic

The array controller architecture described above further includes backup logic 600, representing a preferred embodiment of the present invention. Backup logic 600 includes an industry standard PCMCIA (Personal Computer Memory Card International Association) device 639 along with a small, temporary voltage source 601 made up of a small battery or a gold capacitor. Low power logic 613 and bus 620 are included to provide continuous power and refresh for the transfer buffer 120 as well as power to the components included in backup logic 600. A low power microprocessor or state machine 627 controls the transfer of data from transfer buffer 120 to removable storage medium within the PCMCIA device. Low power microprocessor 627 and PCMCIA device 639 are connected through bus 617, transceivers 615, and buffer busses ABUF through DBUF with transfer buffer 120.

PCMCIA device 639 is either a type 1 form factor device accepting a type 1 flash memory card as the removable storage medium, or a type 3 form factor device accepting a 1.3 inch form factor disk drive, such as the Kittyhawk Personal Storage Module manufactured by Hewlett-Packard Company. Voltage source 601 can be either a small, rechargeable battery, or a gold capacitor having an extremely high capacitance value, such as three farads. Circuitry, not shown, would be included to maintain a charge on the battery or capacitor.

Low power microprocessor 627 can be a low power CMOS microcomputer with self contained microcode (mask programmable ROM) to control operation of transfer buffer 120 and PCMCIA device 639. Alternatively, device 627 could be complex CMOS state machine designed to perform memory transfers from transfer buffer 120 to PCMCIA device 639 as a DMA (direct memory access) device. As a third alternative, the primary array processor 101 could be implemented with advance power management, such as is utilized within current technology notebook computers, to shut off the unused portions of the array controller following the detection of a failure condition. The processor 101 would enter into a low power mode to complete the transfer of buffer data to PCMCIA device 639 and to complete power down operations.

Raid Level 5 Read-Modify-Write Operation

Figure 4:
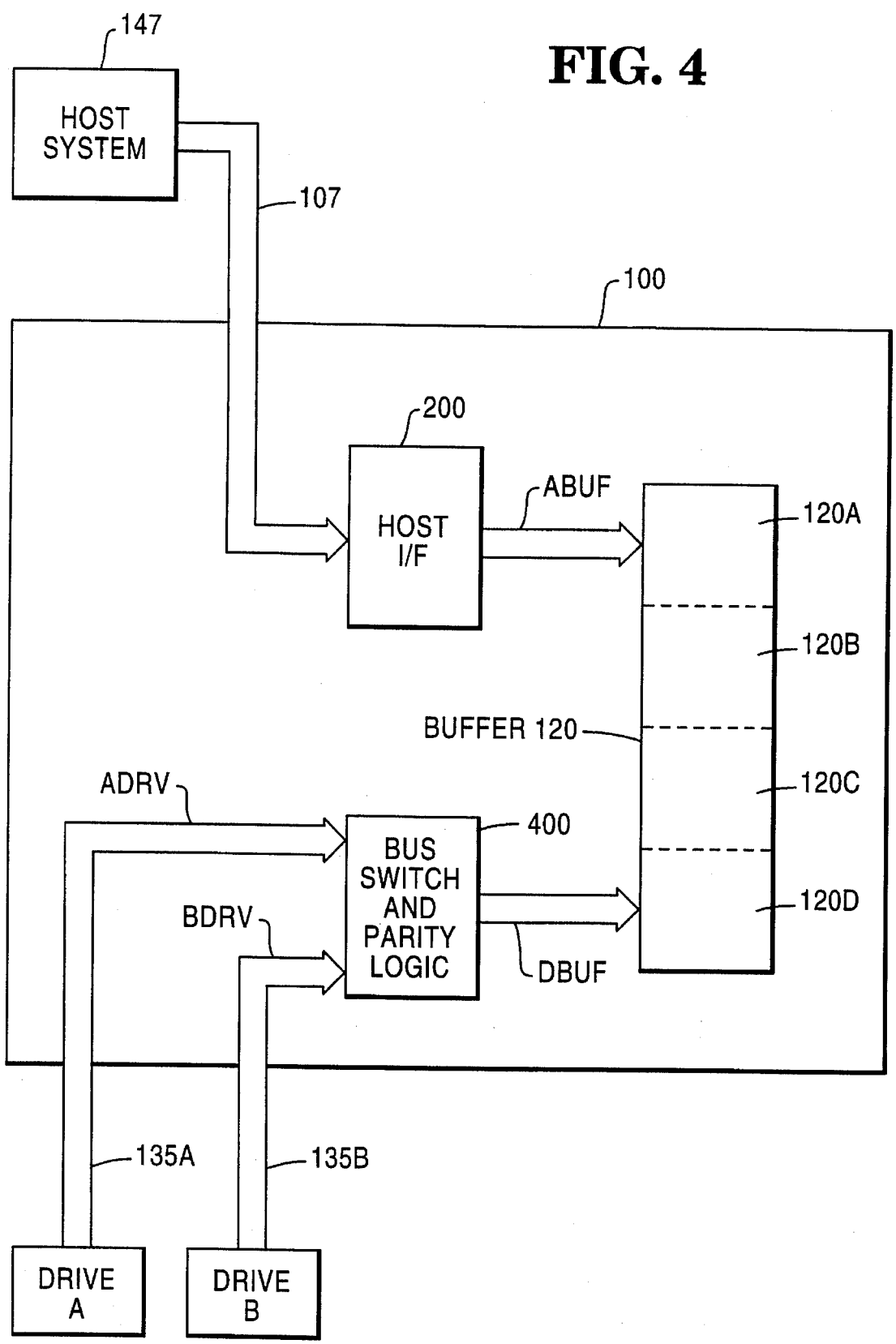
FIGS. 4 and 5 illustrate a traditional RAID level 5 read-modify-write operation.
Figure 5:
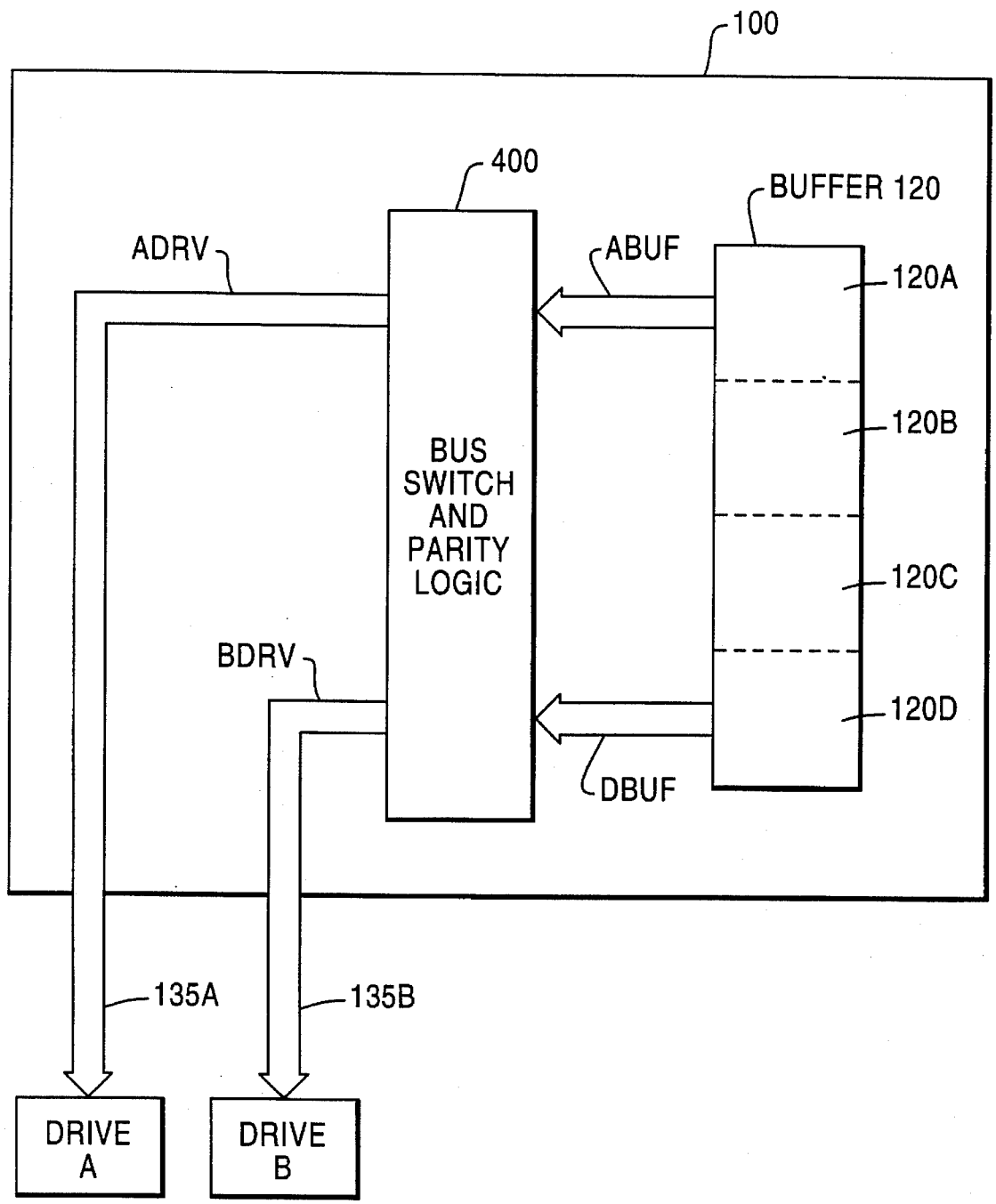

FIGS. 4 and 5 illustrate a RAID level 5 write involving DRIVE A and DRIVE B, wherein data is to be written to DRIVE B and parity information is to be updated on DRIVE A2 Only structure required to facilitate the read-modify-write (RMW) operation is shown in FIGS. 4 and 5.

Under direction of the controller processor, not shown, old data and parity information are first read from the two drives as shown in FIG. 4. The old data and parity are read from the target areas within drives DRIVE B and DRIVE A, respectively, and routed via buses 135B and 135A to bus switch 400. Bus switch 400 is configured to combine the received data and parity to generate the exclusive-OR product: old data XOR old parity. This product is stored in a first area 120D within buffer 120. New data received from host system 147 is concurrently saved to a second area 120A within buffer 120.

New data and parity information is then written to DRIVE B and DRIVE A as shown in FIG. 5. Bus switch 400 is reconfigured to route the new data read from area 120A in storage buffer 120 to DRIVE B. Bus switch 400 is further configured to generate new parity information by combining the new data with the previously saved product, old data XOR old parity, stored in storage buffer area 120D. The result, old data XOR old parity XOR new data, is written to DRIVE A.

To minimize the overall response time seen by the host system upon issuing a write request, the read-modify-write routine may include procedures for reporting write completion status to the host system following the write of new data received from the host system to buffer 120, without waiting for the calculation of new parity and the write of new data and parity information to DRIVE B and DRIVE A.

Delayed Parity Write Operation

FIGS. 6 through 9 illustrate the modified RAID level 5 write operation wherein parity write operations are delayed. As with FIG. 4 and 5, only structure required to facilitate the write operation is shown in FIGS. 6 through 9.

Figure 6:
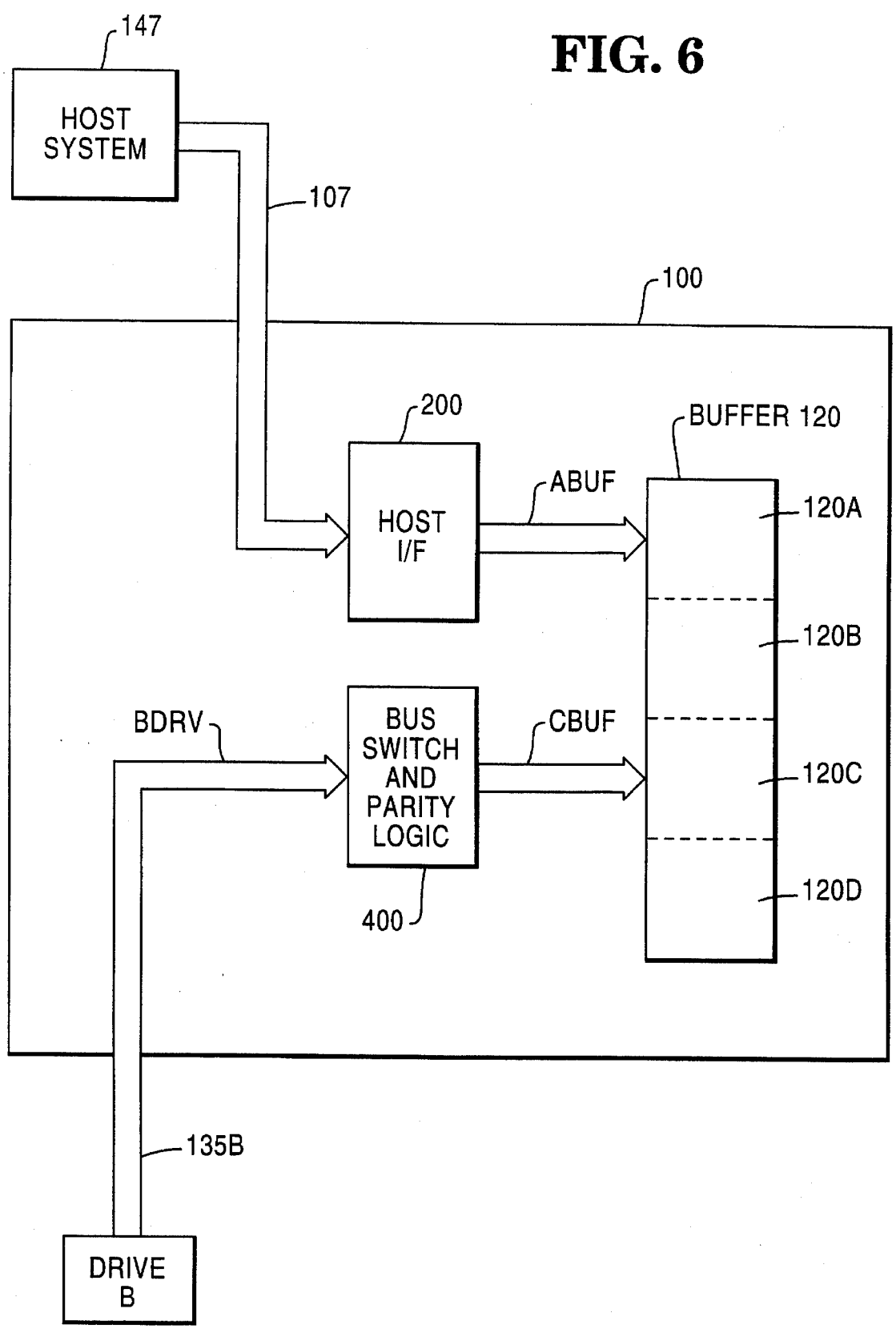
FIGS. 6 through 9 illustrate a modified RAID level 5 write operation wherein parity write operations are delayed.
Figure 7:
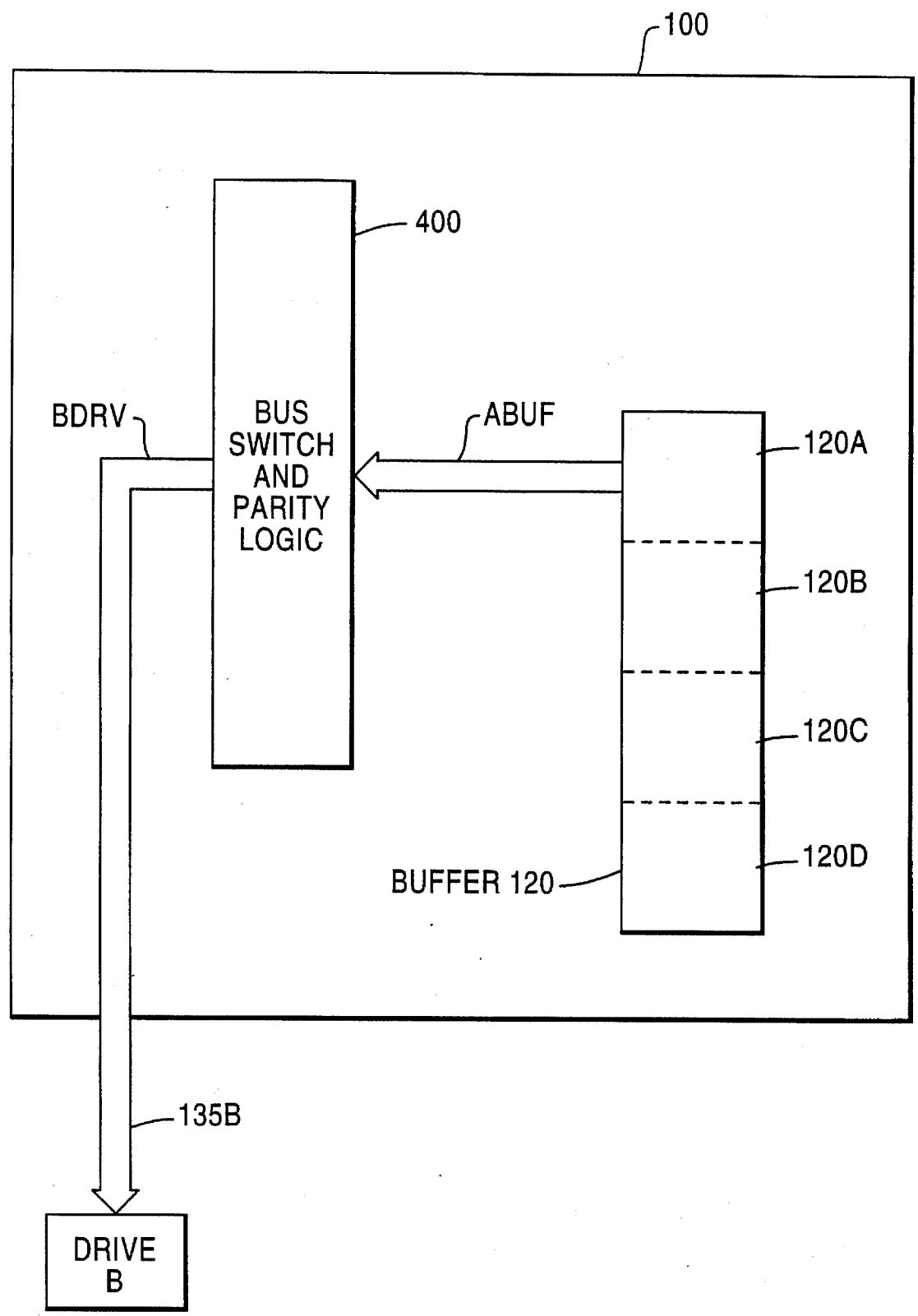

FIG. 6 illustrates the first step in the modified RAID level 5 write operation. During this first step old data received from disk storage and new data received from the host system is saved to buffer 120. In FIG. 6, the new data received from host system 147 is directed through host I/F logic 200 and buffer bus ABUF to a first storage area within buffer 120. Old data is read from DRIVE B and routed via drive buses 135B and BDRV, bus switch 400 and buffer bus DBUF to a second storage area within buffer 120. The new data received from host system 147 is directed through host I/F logic 200 and buffer bus ABUF to a second storage area within buffer 120. Bus switch 400 is thereafter reconfigured and the new data stored in buffer 120 is written to DRIVE B as shown in FIG. 7.

Figure 8:
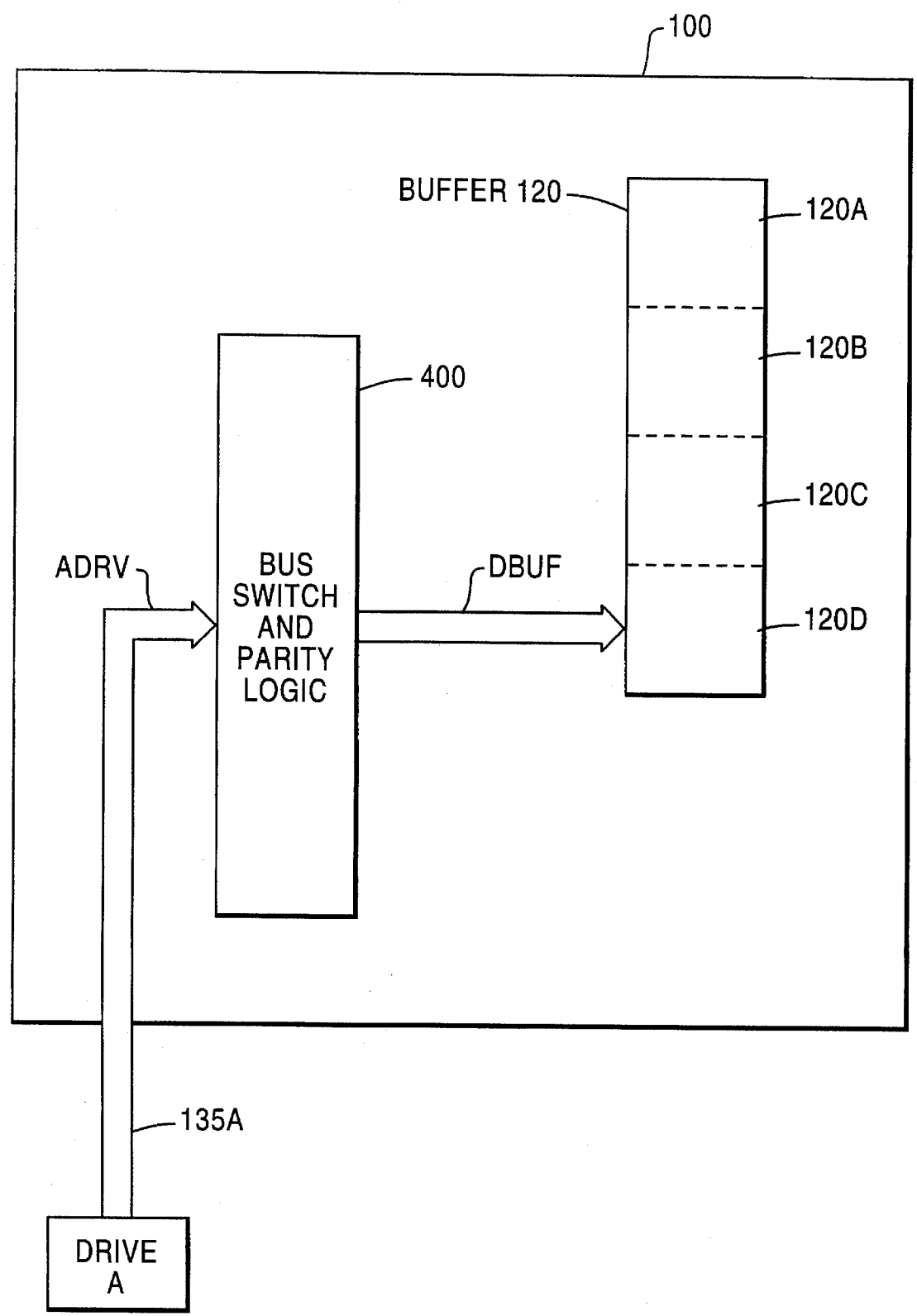
Figure 9:
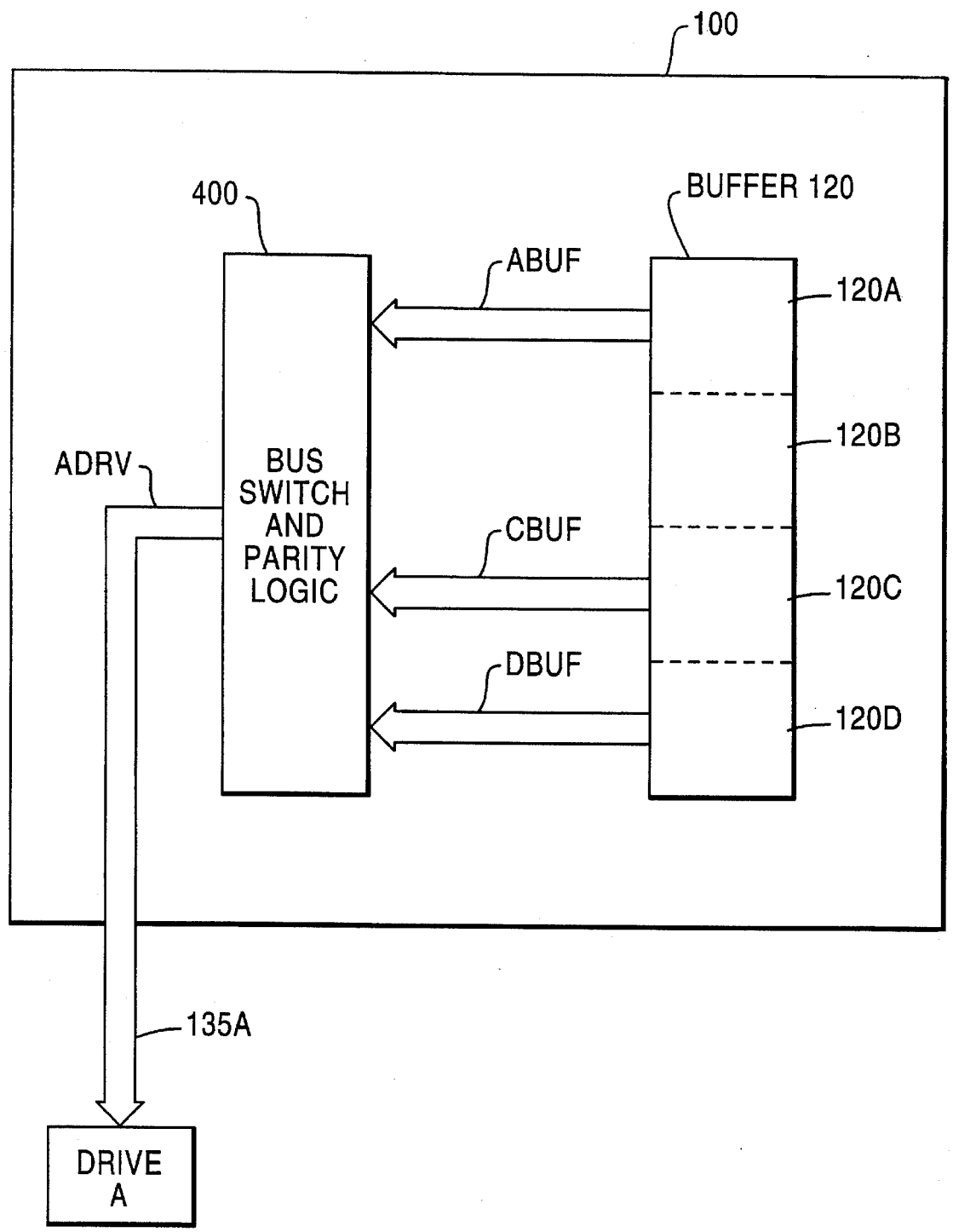

Old parity is read from Drive A and written to area 120D within buffer 120 as shown in FIG. 8. This step may be performed concurrently with, or at any point after, the operation shown in FIG. 6 wherein old data is read from DRIVE B and saved to storage buffer 120. Bus switch 400 is thereafter configured to generate new parity information by combining the new data from storage area 120A, old data from storage area 120C and the old parity from storage area 120D as shown in FIG. 9. The result, old data XOR old parity XOR new data, is written to DRIVE A. The new parity write operation shown in FIG. 9 may be performed immediately upon the conclusion of the old parity read operation shown in FIG. 8, or may be delayed for execution at a more suitable time.

Separating the DRIVE B (data) and DRIVE A (parity) read and write operations allows for more efficient utilization of the disk drives. In the RMW procedure shown in FIGS. 4 and 5 and discussed above, a delay in obtaining access to either the parity or data drives delays the entire RMW operation. Data on DRIVE B is updated as soon as the drive is available; the update is not delayed in the event the parity drive, DRIVE A, is unavailable. Similarly, DRIVE A operations will not be stayed should DRIVE B be unavailable.

By delaying the parity read and write operations involving DRIVE A, the method of the present invention permits utilization of DRIVE A for other input/output operations until such time as the parity read, generate and write operations (FIGS. 8 and 9) can proceed efficiently without inducing disk service time penalties.

Scheduling of disk read and write operations is coordinated by the array controller which maintains separate I/O queues for each drive within the array. The method identifies the disk drives containing the data and parity to be updated, drives DRIVE B and DRIVE A in the example described above, and places the proper read and write requests into the I/O queues for the identified data and parity drives, scheduling parity operations; i.e. reading old parity information from DRIVE A, generating new parity information and writing the new parity information to DRIVE A; for execution when best accommodated in the I/O queue for DRIVE A, following the read of old data from DRIVE B.

In addition, in order to minimize the overall response time seen by the host system upon issuing a write request, the modified write routine may include procedures for reporting write completion status to the host system just after the write of data to DRIVE B is completed, without waiting for the associated parity generation and write to DRIVE A to complete. Alternatively, an earlier write completion status may be reported to the host system following the write of new data received from the host to buffer 120.

Transfer of Write Data to Non-Volatile Storage

By monitoring the voltage provided by the primary voltage source (not shown) for the disk array system, an array failure can be detected. Upon occurrence of such a failure, backup logic 600 assumes control of the disk array system and the majority of the array components are powered down with the exception of transfer buffer 120 and the backup logic 600, including low power processor 627, low power support logic 613 and PCMCIA device 639.

Figure 10:
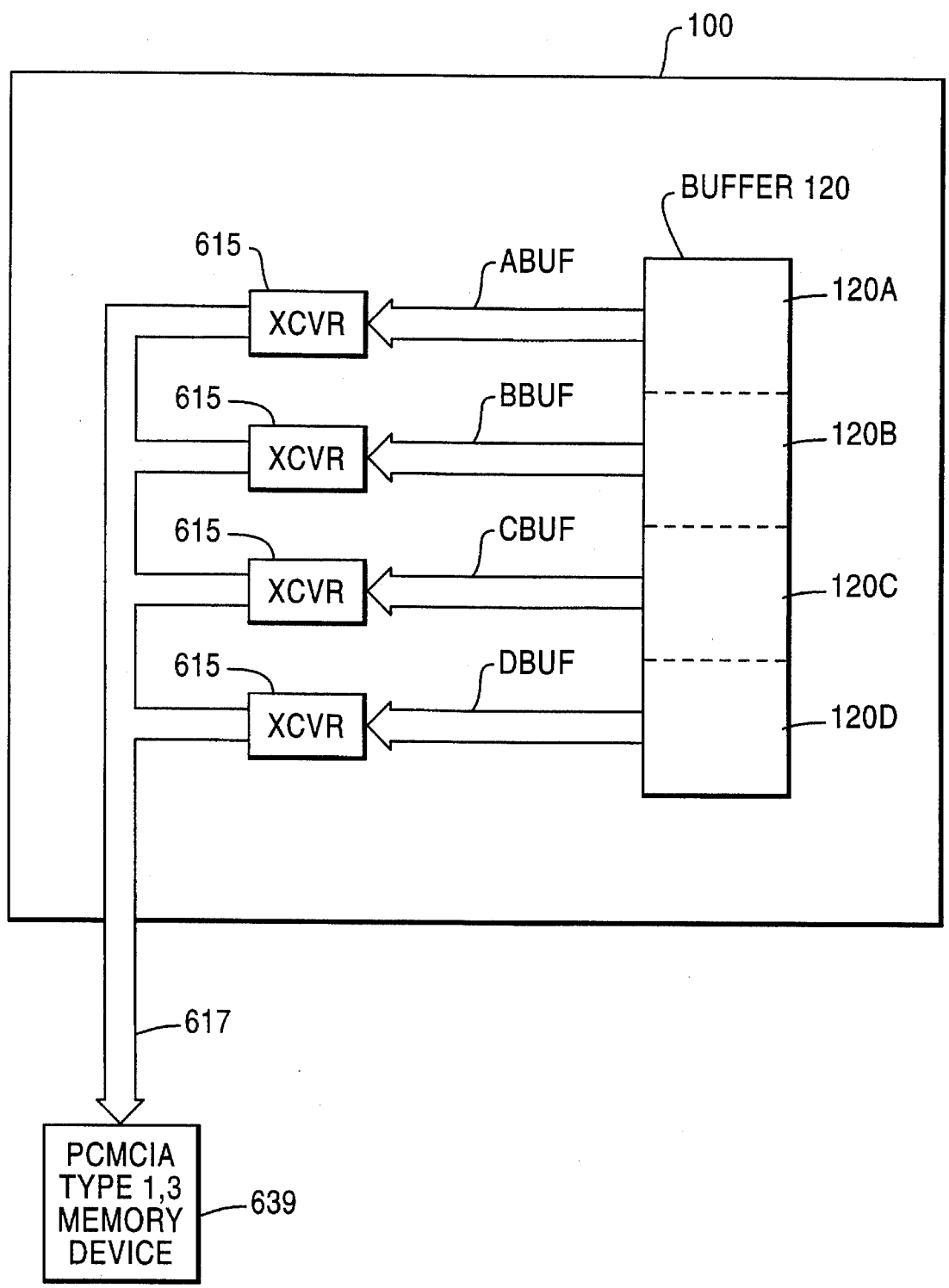
FIG. 10 illustrates the manner in which data residing in transfer buffer 120 is transferred to non-volatile storage upon detection of an array failure.

Low power support logic 613 functions to provide continuous refresh for the transfer buffer 120 as well as power to the components included in logic block 600. Low power processor 627 thereafter initiates a transfer of data residing in transfer buffer 120 to PCMCIA device 639 as shown in FIG. 10. Transceivers 615 are successively activated to connect buffer busses ABUF through DBUF with bus 617 to permit the transfer of data between transfer buffer 120 and PCMCIA device 639, both devices operating under the direction of processor 627.

When backup transfer operation is completed in a period of several seconds. Once the backup transfer operation has been completed, low power processor 627 shuts down to conserve power or battery life.

On restoration of power following a failure of the primary voltage source, main processor 100 interrogates the non-volatile memory, i.e., PCMCIA device 639, to determine if there were any uncompleted array write operations, and if there were, reads the data saved to device 639 to complete the read-modify-write operation which was interrupted by the array failure.

In the event of an array controller hardware failure, the PCMCIA non-volatile storage medium, i.e., a PCMCIA flash memory card or a 1.3 inch form factor disk drive, can be removed from PCMCIA device 639 and inserted into a replacement array controller. The new controller could thereafter complete any operations which were interrupted by the array controller failure.

Figure 11:
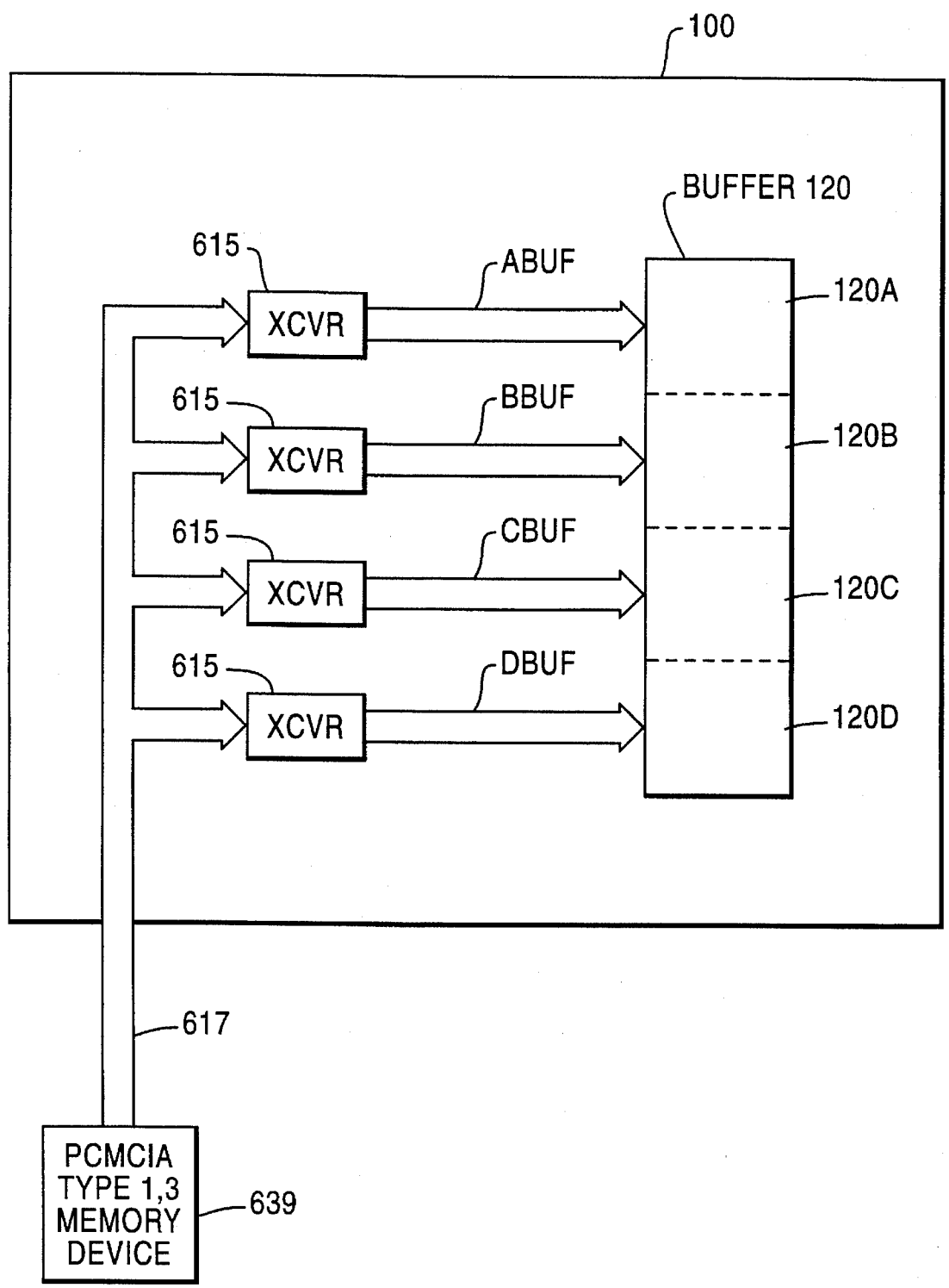
FIG. 11 illustrates the manner in which data transferred to non-volatile storage is restored to transfer buffer 120 upon restoration of the array.

FIG. 11 illustrates the manner in which data transferred to non-volatile storage is restored to transfer buffer 120 upon restoration of the array. Transceivers 615 are successively activated to connect buffer busses ABUF through DBUF with bus 617 to permit the transfer of data between transfer buffer 120 and PCMCIA device 639 and transfer buffer 120, both devices operating under the direction of processor 627.

It can thus be seen that there has been provided by the present invention a method and structure for safeguarding disk array early write operations, thereby preventing the loss of data resulting from the occurrence of a power failure or array failure prior to completion of all write procedures.

Although the presently preferred embodiment of the invention has been described, it will be understood that various changes may be made within the scope of the appended claims.

What is claimed is:

1. In a data storage system wherein write data received from a host is written into a transfer buffer and a write complete status signal is provided by the data storage system to the host prior to said write data being written to a permanent storage device within said data storage system, a method for preventing the loss of data residing in said transfer buffer comprising the steps of:

transferring the data residing in said transfer buffer to a low power non-volatile storage device upon an occurrence of a data storage system failure and, in the absence of said data storage system failure, not transferring the data residing in said transfer buffer to said low power non-volatile storage device and in which said low power non-volatile storage device receives the data from said transfer buffer after the data has been received by said transfer buffer upon occurrence of said data storage system failure and the data transferred to said low power non-volatile storage device being the same data that is to be transferred to said permanent storage device, wherein said low power non-volatile storage device is different from said permanent storage device and in which less power is utilized in transferring data residing in said transfer buffer to said low power non-volatile storage device than power utilized in transferring data residing in said transfer buffer to said permanent storage device.

2. The method in accordance with claim 1, wherein the permanent storage device is selected from a group including RAID levels 2, 3, 4, and 5 disk array systems.

3. The method in accordance with claim 1, wherein said low power non-volatile storage comprises a PCMCIA device.

4. In a data storage system wherein write data received from a host is written into a transfer buffer and a write complete status signal is provided by the data storage system to the host prior to said write data being written to a permanent storage device within said data storage system, a method for preventing the loss of data residing in said transfer buffer comprising the steps of:

monitoring the operation of said data storage system to detect an occurrence of a data storage system failure;

providing a low power non-volatile storage device;

providing a low power backup transfer circuitry for transferring the data residing in said transfer buffer to said low power non-volatile storage device, wherein said low power backup transfer circuitry is different from write circuitry within said data storage system that is used to transfer the data residing in said transfer buffer to said permanent storage device and in which said low power backup transfer circuitry utilizes less power than said write circuitry to transfer the data residing in said transfer buffer;

providing a small voltage source for temporarily supplying power to said transfer buffer, said low power backup transfer circuitry, and said low power non-volatile storage device upon the occurrence of a data storage system failure; and using said low power backup transfer circuitry to transfer the data residing in said transfer buffer to said low power non-volatile storage device upon the occurrence of a data storage system failure.

5. The method in accordance with claim 4, wherein the permanent storage device is selected from a group including RAID levels 2, 3, 4, and 5 disk array systems.

6. The method in accordance with claim 4, wherein said low power non-volatile storage comprises a PCMCIA device.

7. The method in accordance with claim 4, wherein said small voltage source comprises a gold capacitor for supplying power.

8. The method in accordance with claim 7, wherein said gold capacitor has a high capacitance value, such as three farads.

9. The method in accordance with claim 4, wherein said small voltage source comprises a small, rechargeable battery for supplying power.

10. A memory backup system for a data storage system, the data storage system including a transfer buffer, write circuitry, and a permanent storage device and receiving power from a main power source, wherein write data received from a host is written into the transfer buffer and a write complete status signal is provided by the data storage system to the host prior to the write circuitry writing said write data to the permanent storage device, said memory backup system comprising:

a low power non-volatile storage device connected to transfer data with the transfer buffer;

a small voltage source for temporarily supplying power; and low power backup transfer circuitry responsive to the receipt of a signal from the data storage system indicating the occurrence of a data storage system failure for controlling the operation of said small voltage source to provide power to said low power non-volatile storage device, the transfer buffer, and said low power backup transfer circuitry, for controlling said low power non-volatile storage device and the transfer buffer to transfer data residing in the transfer buffer to said low power non-volatile storage device, and for substantially electrically isolating said small voltage source from the main power source, the permanent storage device, and the write circuitry so as to reduce the power provided by said small voltage source during the transfer of data residing in the transfer buffer to said low power non-volatile storage device, wherein said low power backup transfer circuitry is different from the write circuitry and utilizes less power than the write circuitry to transfer data residing in the transfer buffer.

11. The memory backup system in accordance with claim 10, wherein the permanent storage device is selected from a group including RAID levels 2, 3, 4, and 5 disk array systems.

12. The memory backup system in accordance with claim 10, wherein said low power non-volatile storage comprises a PCMCIA device.

13. The memory backup system in accordance with claim 12, wherein said PCMCIA device comprises a PCMCIA type 1 flash memory card device.

14. The memory backup system in accordance with claim 12, wherein said PCMCIA device comprises a PCMCIA type 3 small form factor disk drive.

15. The memory back up system in accordance with claim 10, wherein said small voltage source comprises a gold capacitor for supplying power.

16. The memory backup system in accordance with claim 15, wherein said gold capacitor has a high capacitance value, such as three farads.

17. The memory backup system in accordance with claim 10, wherein said small voltage source comprises a small, rechargeable battery for supplying power.

18. A data storage system for storing data received from a host system, said data storage system comprising:

a first non-volatile storage device for the storage of data received from the host system;

a transfer buffer connected between the host system and said first non-volatile storage device, wherein data received from the host system is written into said transfer buffer and a right complete status signal is provided by said data storage system to the host prior to said data being written to said first non-volatile storage device; and a memory backup system including a second non-volatile storage device that is different from said first non-volatile storage device and in which said second non-volatile storage device utilizes less power to write data residing in said transfer buffer than the power utilized by said first non-volatile storage device when writing data residing in said transfer buffer, and transfer means, connected with said transfer buffer, for transferring data residing in said transfer buffer to said second non-volatile storage device in response to an occurrence of a data storage system failure, said transfer means comprising a low power microprocessor for operating in a first power mode when transferring data from said transfer buffer to said first non-volatile storage device and a second power mode when transferring data from said transfer buffer to said second non-volatile storage device, wherein said low power microprocessor utilizes less power when operating in said second power mode than when operating in said first power mode.

19. The data storage system in accordance with claim 18, wherein:

said transfer buffer is a DRAM memory device requiring a refresh signal so as to retain data residing in said DRAM memory device; and said memory backup system includes means responsive to said data storage system failure for providing a refresh signal to said DRAM memory device that is different from a refresh signal provided by said data storage system to said DRAM memory device.

20. The data storage system in accordance with claim 18, wherein:

said transfer buffer is an SRAM memory device.

21. The data storage system in accordance with claim 18, wherein said memory backup system further includes:

a small voltage source connected to temporarily provide power to said transfer buffer and said second non-volatile storage device; and logic responsive to a data storage system failure for controlling the operation of said voltage source to provide power to said non-volatile storage device and said transfer buffer.

22. The memory backup system in accordance with claim 18, wherein said first non-volatile storage device is selected from a group including RAID levels 2, 3, 4, and 5 disk array systems.

23. The memory backup system in accordance with claim 18, wherein said second non-volatile storage device comprises a PCMCIA device.

24. The memory backup system in accordance with claim 23, wherein said PCMCIA device comprises a PCMCIA type 1 flash memory card device.

25. The memory backup system in accordance with claim 23, wherein said PCMCIA device comprises a PCMCIA type 3 small form factor disk drive.

26. The memory backup system in accordance with claim 21, wherein said small voltage source comprises a gold capacitor for supplying power.

27. The memory backup system in accordance with claim 26, wherein said gold capacitor has a high capacitance value, such as three farads.

28. The method in accordance with claim 21, wherein said small voltage source comprises a small rechargeable battery for supplying power.

29. The memory backup system in accordance with claim 10, wherein:

said low power backup transfer circuitry comprises a state machine logic device for performing memory transfers from the transfer buffer to said low power non-volatile storage device.

30. The memory backup system in accordance with claim 10, wherein:

said low power backup transfer circuitry comprises refresh means for providing a refresh signal to the transfer buffer that is different from a refresh signal provided by the data storage system to the transfer buffer, said refresh means thereby maintaining the integrity of data residing in the transfer buffer until the data transfer to said low power non-volatile storage device is completed.

31. The memory backup system in accordance with claim 10, wherein said low power backup transfer circuitry includes:

a backup data bus for transferring data between the transfer buffer and said low power non-volatile storage, wherein said backup data bus is different from a main data bus within the data storage system that is used to transfer data between the transfer buffer and the permanent storage device; and means for electrically isolating said backup data bus from the main data bus in response to the receipt of said signal indicating the occurrence of a data storage system failure so as to reduce the power provided by said small voltage source during the transfer of data from the transfer buffer to said low power non-volatile storage device.

* * * * *